United States Patent [19]

McCarty et al.

[11] Patent Number: 6,112,137
[45] Date of Patent: Aug. 29, 2000

[54] ADAPTIVE SYSTEM FOR PREDICTIVE CONTROL OF DISTRICT PRESSURE REGULATORS

[75] Inventors: Joe McCarty, Gary, Ind.; Christopher J. Ziolkowski, Elmhurst, Ill.

[73] Assignee: Gas Research Institute, Chicago, Ill.

[21] Appl. No.: 09/018,397

[22] Filed: Feb. 4, 1998

[51] Int. Cl.⁷ .................................................. G05D 16/00
[52] U.S. Cl. ........................... 700/301; 700/300; 700/46; 700/47; 700/299; 137/613; 137/614.13; 137/614.11
[58] Field of Search ................................. 700/46, 47, 48, 700/52, 301, 299, 300; 137/613, 614.11, 614.13, 12, 14, 487.5, 486

[56] References Cited

U.S. PATENT DOCUMENTS

| | | | |
|---|---|---|---|
| 3,878,376 | 4/1975 | Sholes, Jr. et al. | 235/151.34 |
| 4,197,576 | 4/1980 | Sanchez | 700/2 |
| 4,200,911 | 4/1980 | Matsumoto | 364/105 |
| 4,562,552 | 12/1985 | Miyaoka et al. | 364/510 |
| 4,569,012 | 2/1986 | Sekozawa et al. | 364/164 |
| 4,835,687 | 5/1989 | Martin | 364/402 |
| 4,858,640 | 8/1989 | Kaufmann | 137/236.1 |
| 5,047,965 | 9/1991 | Zlokovitz | 364/558 |
| 5,384,698 | 1/1995 | Jelinek | 700/46 |
| 5,422,806 | 6/1995 | Chen et al. | 700/46 |
| 5,448,476 | 9/1995 | Kurokawa et al. | 700/301 |
| 5,579,244 | 11/1996 | Brown | 700/301 |
| 5,594,665 | 1/1997 | Walter et al. | 700/301 |
| 5,682,308 | 10/1997 | Takata et al. | 700/46 |
| 5,768,121 | 6/1998 | Federspiel | 700/46 |
| 5,831,850 | 11/1998 | Chebre et al. | 700/46 |
| 5,841,654 | 11/1998 | Verissimo et al. | 700/83 |
| 5,844,794 | 12/1998 | Keeley | 700/83 |
| 5,896,289 | 4/1999 | Struger | 700/83 |
| 5,954,089 | 9/1999 | Seymour | 700/301 |

FOREIGN PATENT DOCUMENTS

| | | |
|---|---|---|
| 087 766 | 9/1983 | European Pat. Off. . |
| 42 05 010 | 8/1993 | Germany . |
| 5-119808 | 5/1993 | Japan . |
| 8-239868 | 9/1996 | Japan . |

OTHER PUBLICATIONS

S. Canu et al.: *Formal Neural Network as an Adaptive Model for Water Demand*, Proceedings of the International Neural Network Conference, Paris, France, vol. 1, 131–136, Jul. 9–13, 1990.

F. Ashouri: *An Expert System for Predicting Gas Demand: A Case Study*, OMEGA Int. J. of Mgmt Sci., vol. 21, No. 3, 307–317, 1993.

R. Fildes et al.: *One day ahead demand forecasting in the utility industries: Two case studies*, Journal of Operational Research Society, vol. 48, No. 1, Jan. 15–24, 1997.

F.K. Lyness: *Consistent Forecasting of Severe Winter Gas Demand*, Journal of Operational Research Society, vol. 32, No. 5, 347–359, Jul. 1990.

*Primary Examiner*—Paul P. Gordon
*Assistant Examiner*—Rameth Patel
*Attorney, Agent, or Firm*—Pauley Petersen Kinne & Fejer

[57] ABSTRACT

A method and apparatus for controlling a fluid distribution regulator disposed in a fluid distribution system in which an intelligent controller is operatively connected to at least one fluid district regulator for controlling the district regulator. At least one intelligent low-pressure monitor is connected to the distribution system at a distance from the fluid district regulator and monitors ambient temperature and fluid pressure in the distribution system. A computer is operatively connected to the intelligent controller and the intelligent monitor and provides status checks and manual overrides of the intelligent controller and the intelligent monitor. An adaptive algorithm proximate the intelligent controller generates a prediction of fluid demand and a corresponding district regulator fluid outlet pressure setting based upon feedback from the intelligent monitor.

22 Claims, 1 Drawing Sheet

ADAPTIVE SYSTEM FOR PREDICTIVE CONTROL OF DISTRICT PRESSURE REGULATORS

BACKGROUND OF THE INVENTION

1. Field of the Invention

This invention relates to a system for controlling the outlet pressures of district regulators in a fluid distribution system proportionally to the demand of the fluid. More particularly, this invention relates to an adaptive system that varies the output pressures of district regulators in natural gas distribution systems proportionally to the demand for gas. The system predicts the demand for natural gas and raises or lowers outlet pressures in anticipation of the demand so as to maintain a relatively constant pressure at points of the distribution system remote from district regulators. The prediction is automatically formulated based on temperature, time of day, and the observed past performance of the distribution system.

The invention includes a distributed intelligence system that adaptively converges to an accurate prediction of natural gas loads. The predictive function is performed by intelligent controllers located at the district regulators. Intelligent low pressure monitors are located at remote points on the gas distribution system. A centralized computer is used to communicate with the distributed controllers and to provide a manual override, but is not necessary for day to day operation.

2. Description of Prior Art

Currently, outlet pressures for district regulators in fluid distribution systems such as natural gas distribution systems are manually set on a seasonal basis. This represents a very coarse prediction of the demand for gas. The outlet pressure is set to the highest value expected to be necessary for the season. The operator chooses the setting based on past history for the particular distribution system. Because the demand can fluctuate greatly within a season, the outlet pressure is higher than optimum most of the time.

Numerous techniques have been employed to achieve real time correlation between the demand for a fluid, such as natural gas, and district regulator outlet pressures. The feedback approach utilizes pressure sensors at low pressure points in the fluid distribution system in constant communication with controllers located at the district regulators. For example, U.S. Pat. No. 3,878,376 teaches a computer operated solenoid valve pressure control system including a computer, equipment which converts the computer instructions to electrical power to operate solenoid valves which, with associated components, pressurize or depressurize a closed volume, and a pressure measuring system which provides feedback to the computer. Although the feedback approach provides control based on real-time demand, it requires the presence of a constant communication channel and, thus, the attendant expenses associated therewith.

An alternative approach which circumvents the need for a constant communication channel is the purely predictive approach which involves placement of a pre-programmed load profile in a controller at the district regulator. The load profile contains the demand for gas versus the time of day and temperature. For example, U.S. Pat. No. 4,200,911 teaches a method and apparatus for optimum distribution of water in which the actual water consumption at selected nodes of a network from which water is supplied to consumers is measured to detect a standard pattern for water demand in each selected area. Predicted demand patterns for each and every node are then determined by comparing the characteristics or attributes of each area with those of areas having standard demand patterns. Manipulated variables of pumps and valves installed in the pipeline network are then controlled on the basis of predicted demand patterns. See also U.S. Pat. No. 4,562,552 and U.S. Pat. No. 4,569,012, both of which also teach predictive approaches. See also U.S. Pat. No. 5,047,965 which teaches a microprocessor controlled gas pressure regulator valve having a spring biased diaphragm controlled pilot valve whereby adjustment is automatically effected by supplying augmenting pressure to the spring side of the diaphragm by means of an electrically adjustable regulator valve under the control of the microprocessor. Historical pressure drop data as a function of day of the week, time of day, and ambient temperature are stored in the microprocessor. The temperature sensor provides the microprocessor with a signal indicative of ambient temperature, and this is correlated with the stored historical data to determine the adjustment for the main regulator valve. The problem with each of these predictive approaches is the requirement that the profile be compiled by an experienced operator and be updated periodically as system loading varies over the long term. Failure to periodically update the profile on a frequent basis can significantly reduce the effectiveness of the predictive approach and, of course, the requirement for a human operator to update the profile adds significantly to the cost of this approach.

SUMMARY OF THE INVENTION

Accordingly, it is one object of this invention to provide a control system for outlet pressure adjustment of a district regulator of a fluid distribution system so as to satisfy a real-time demand for a fluid distributed by the fluid distribution system which employs a predictive approach and automates the creation of a load profile.

It is another object of this invention to provide a control system for outlet pressure adjustment of a district regulator of a fluid distribution system which, in addition to automating the creation of a load profile, also provides a mechanism for updating the load profile.

It is yet another object of this invention to provide a control system for outlet pressure adjustment of a district regulator of a fluid distribution system so as to satisfy a real-time demand for a fluid distributed by the fluid distribution system which eliminates the need for a continuously open communication channel between the district regulator station and remote portions of the fluid distribution system.

These and other objects of this invention are achieved by a fluid distribution system comprising a plurality of distribution pipelines, at least one fluid district regulator, and control means for controlling the at least one fluid district regulator, an intelligent controller means operatively connected to the at least one fluid district regulator for controlling the district regulator, at least one intelligent monitor means for monitoring ambient temperature and fluid pressure in the distribution pipelines operatively connected to at least one of the distribution pipelines at a distance from the fluid district regulator, computer means for providing status checks and manual overrides of the intelligent controller means and the intelligent monitor means operatively connected to the intelligent controller means and the intelligent monitor means, and an adaptive algorithm, said adaptive algorithm generating a prediction of fluid demand and a corresponding district regulator fluid output pressure setting. In accordance with a particularly preferred embodiment of this invention, the adaptive algorithm comprises an adaptive finite impulse response (AFIR) filter.

More particularly, this invention provides an adaptive/predictive control system for outlet pressure adjustment of at least one district regulator of a fluid distribution system so as to satisfy a real-time demand for a fluid distributed by the fluid distribution system comprising at least one intelligent controller means for controlling the district regulator, at least one intelligent monitor means disposed in said fluid distribution system at a distance from said district regulator, supervisory computation means for providing status checks and manual overrides of the intelligent controller means and the intelligent monitor means, and an adaptive algorithm disposed proximate the intelligent controller means, whereby the adaptive algorithm generates a prediction of fluid demand and a corresponding district regulator fluid outlet pressure setting.

The intelligent controller means for controlling the district regulator comprises controller communication means for communicating with the intelligent monitor means, controller pressure adjustment means for adjusting the outlet pressure of the district regulator, controller inlet pressure sensing means for sensing a fluid inlet pressure of the district regulator, controller output pressure sensing means for sensing a fluid outlet pressure of the district regulator, controller ambient temperature sensing means for sensing a controller ambient temperature proximate the district regulator, and a time of day clocked disposed proximate the district regulator.

The at least one intelligent monitor means comprises monitor communication means for communicating with the controller communication means, monitor pressure sensing means for sensing a fluid pressure in the fluid distribution system proximate the intelligent monitor means, and monitor ambient temperature sensing means for sensing a monitor ambient temperature proximate the monitor means.

This invention also includes a method for controlling a fluid distribution regulator disposed in a fluid distribution system comprising the steps of collecting actual fluid pressure data and ambient temperature data of the fluid distribution system at a distance from the fluid distribution regulator, communicating the actual fluid pressure data and the ambient temperature data to an intelligent controller operatively connected to the fluid distribution regulator, processing the actual fluid pressure data and ambient temperature data using an adaptive algorithm at the intelligent controller together with a controller local time, controller ambient temperature, and fluid distribution regulator outlet pressure data, resulting in generation of a predicted fluid distribution regulator outlet pressure, and comparing the predicted fluid distribution regulator outlet pressure to the actual fluid pressure data. The processing of the actual fluid pressure data and the ambient temperature data to generate the predicted fluid distribution regulator outlet pressure, and comparing the predicted fluid distribution regulator outlet pressure to the actual fluid pressure data is iteratively repeated until a difference between the actual fluid pressure data and the predicted fluid distribution regulator outlet pressure is sufficiently small. At that point, control of the fluid distribution regulator outlet pressure is transferred to the adaptive algorithm. At this point, communication between the district regulator station and the remote fluid distribution system monitor is no longer required, and, thus, so long as the flow conditions within the flow distribution system remain within a certain predetermined bandwidth, the communication link or channel can be deactivated.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
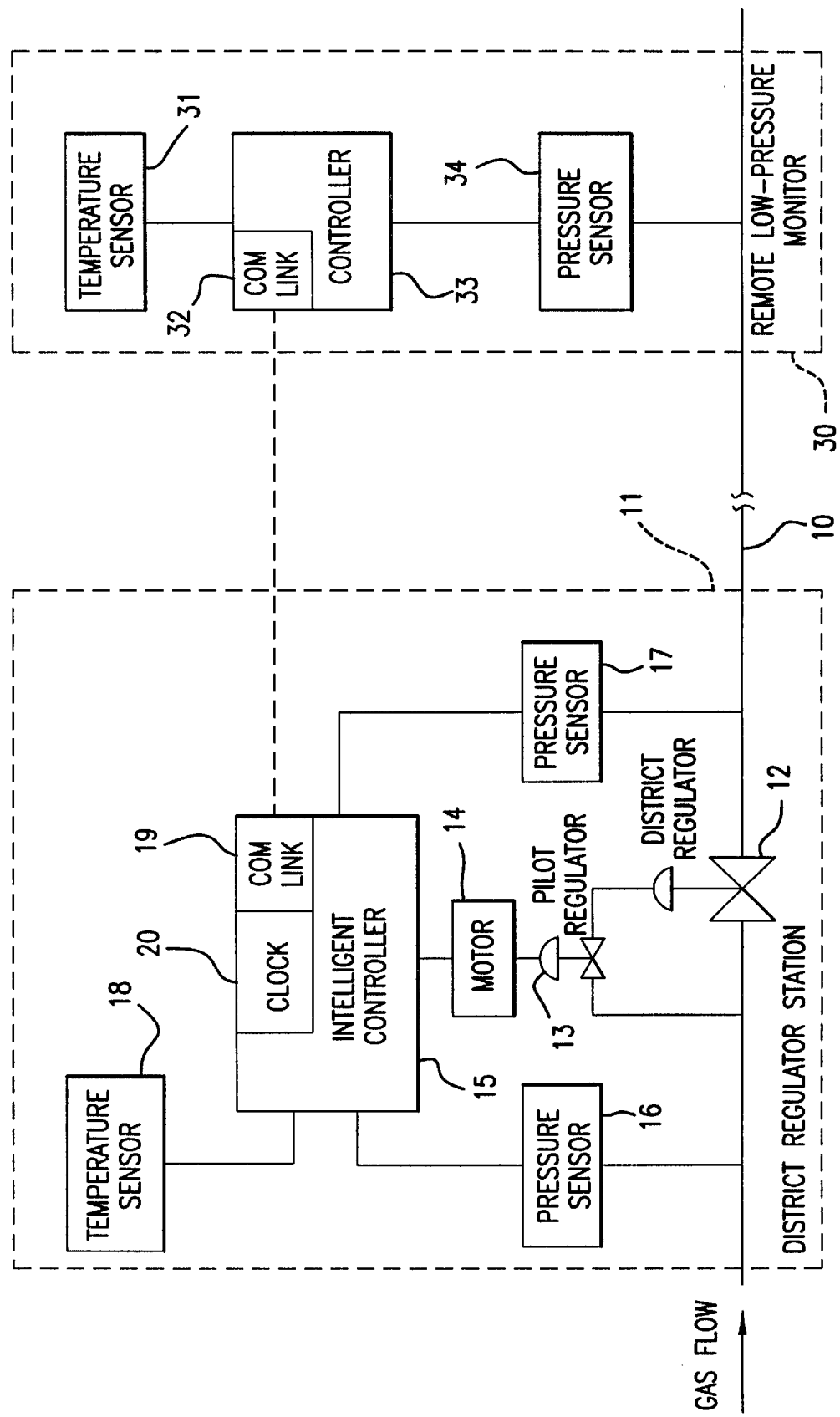
FIG. 1 is a schematic diagram showing a portion of a fluid distribution system comprising a district regulator station and a remote low-pressure monitor in accordance with one embodiment of this invention.

FIG. 1 is a schematic diagram of a portion of a natural gas distribution system comprising a district regulator station 11 and a remote low-pressure monitor 30. Although this invention will be described in the context of a natural gas distribution system, it will be apparent to those skilled in the art that the concepts are equally applicable to other fluid distribution systems, including water distribution systems, and, accordingly, no intent to limit the invention to natural gas fluid distribution systems should be inferred from this description.

In order to effect the adjustment of outlet pressures from district regulator 12 of district regulator station 11, district regulator 12 is provided with intelligent controller 15. To carry out the adjustment function, means for converting an electrical signal into a pneumatic signal suitable for controlling the district regulator are provided. This is typically accomplished by turning an adjustment screw of pilot regulator 13 with an electric motor 14, although other means are available. In communication with intelligent controller 15 are district regulator inlet pressure sensor 16 which monitors the inlet pressure to the district regulator 12 to verify that there is sufficient driving pressure for proper operation and district regulator outlet pressure sensor 17 which monitors the outlet pressure of district regulator 12 to verify that a desired set point is being properly maintained. In order to carry out these functions, it will be apparent that an electrical power source is also required. In summary, the means for adjusting the outlet pressure of district regulator 12 to maintain a given set point comprise a local feedback loop comprising district regulator inlet pressure sensor 16, district regulator outlet pressure sensor 17, both of which are operatively connected to intelligent controller 15, and motor 14 and pilot regulator 13, disposed between intelligent controller 15 and district regulator 12 for adjusting the opening and closing of district regulator 12 in accordance with instructions from intelligent controller 15.

In addition to means for adjusting the district regulator outlet pressure to maintain a given set point, a means for generating an appropriate set point is also required. The generation of the set point additionally requires a time of day clock 20, ambient air temperature sensor 18 for monitoring the temperature proximate the district regulator station 11 and, thus, district regulator 12, and a communication link 19 proximate district regulator 12. Thus, time and temperature are parameters that are always available locally at the district regulator station.

To generate an appropriate set point, it is also necessary to obtain pressure and temperature data from low-pressure points within the distribution system that are remote from district regulator 12, such data only being required during the adaptation or training period of an adaptive algorithm disposed proximate district regulator station 11.

Remote low-pressure monitor 30 comprises an intelligent controller 33, a source of electrical power, a remote pressure sensor 34, a remote temperature sensor 31, and a communication link in communication with the communication link of the district regulator controller. Pressure sensor 34 is connected to gas distribution pipeline 10 at a point remote from any district regulators. A pressure set point and tolerance are programmed into remote low-pressure monitor 30, the set point plus or minus the tolerance form a deadband within which it is desired to maintain the fluid distribution system pressure. Remote low-pressure monitor 30 records the gas pressure in fluid distribution pipeline 10 and the ambient temperature proximate remote low-pressure monitor 30. However, no communication through communication link 32 to communication link 19 of controller 15 is established unless the pressure measured by remote pressure sensor 34 exceeds the limits of the programmed deadband, at which time remote low-pressure monitor 13 transmits its temperature and pressure data to one or more district regulator intelligent controllers 15. In this manner, remote low-pressure monitor 30 provides district regulator intelligent controller 15 with a set point during adaptation of the intelligent controller 15 in accordance with the adaptive algorithm. This arrangement provides an outer feedback loop in cascade with the local loop around district regulator 12.

Upon receiving data from remote low-pressure monitor 30, district regulator controller 15 adjusts the outlet pressure of district regulator 12 so as to bring the remote distribution system pressure back within the programmed deadband. This interaction between remote low-pressure monitor 13 and district regulator controller 15 constitutes feedback control. Concurrent with the feedback control, the adaptive portion of the algorithm processes the data received from remote low-pressure monitor 30 together with the local time, ambient temperature, and outlet pressure data at district regulator station 11 to generate a predicted district regulator outlet pressure. This predicted district regulator outlet pressure is compared to the actual district regulator outlet pressure derived from the feedback control as measured by district regulator outlet pressure sensor 17. The predicted outlet pressure is iteratively improved with each communication from remote low-pressure monitor 30. When the difference between the feedback pressure from remote low-pressure monitor 30 and the predictive outlet pressure established by the adaptive algorithm becomes sufficiently small, adaptation of the district regulator controller is complete and the predictive portion of the adaptive/predictive algorithm assumes control of the district regulator outlet pressure. At this point, the need for communication initiated by remote low-pressure monitor 13 through the communication link between remote low-pressure monitor 30 and district regulator controller 15 is greatly reduced or eliminated.

The general mathematical form of the adaptive/predictive algorithm utilized by the method and apparatus of this invention is that of an adaptive finite impulse response (AFIR) filter. In accordance with such an algorithm, a system parameter, in the case of this invention, a change in temperature, is sampled at a regular time interval. This stream of sampled values is fed into the filter algorithm. A finite number of samples are always retained, the receipt of the newest sample overriding the oldest sample. This set, or vector of samples, is multiplied by a set of coefficients and the sum of these products taken. This sum of products, or dot product of the sample and coefficient vectors is the prediction or estimate of the change necessary to the district regulator outlet pressure. The predicted district regulator outlet pressure is subtracted from the feedback derived outlet pressure to form an error term. This error term is then used to refine the values of the coefficients. After a sufficient number of iterations, the predicted value converges with the feedback value, and the error term approaches zero. Due to numerical round-off and digital quantization effects, the error term cannot actually reach zero. However, the predicted value can converge closely enough to the feedback derived value of the outlet pressure to be used in its place.

In practice, the adaptive finite impulse response filter for temperature can be constructed in accordance with one of two methods. In accordance with the first method, the district regulator outlet pressure as derived from feedback control and temperature are used as inputs to the AFIR filter. The output of the filter is a prediction of the district regulator outlet pressure. After the predicted district regulator outlet pressure converges reasonably with the feedback derived outlet pressure, the AFIR filter is given control of the outlet pressure. Any additional feedback from the remote low-pressure monitor 30, if it occurs, is added as a differential correction term to the predicted value.

Alternatively, the change in pressure and the change in temperature are used as inputs into a one-element AFIR filter, only when both inputs are non-zero. The output of the filter is a differential term similar to the one acquired from the feedback from remote low-pressure monitor 13 and is added to the current district regulator station inner loop set point. The new set point is equal to the old set point plus the differential terms from the feedback and the AFIR filter.

The time of day information is separated from the temperature by monitoring changes in the district regulator outlet pressure and changes in the temperature. If the pressure changes, but not the temperature, the pressure change is fed to an auto-regression filter. A day is divided into N equally spaced time intervals and an element in a numerical array is assigned to each interval. A fraction of the pressure change is added to the current array element and to each of the n preceding elements, where n is greater than one and less than N. In this way, repetitive pressure changes will be anticipated by the array elements preceding the occurrence. Repeating patterns of pressure changes result in non-zero values being accumulated into the array. Non-periodic pressure changes tend to average to zero, leaving the periodic values unobscured. As each element of the array becomes the current one, the value contained in the current array element is added to the district regulator station inner loop set point. In addition, the current array element has a small amount subtracted from it at each pass to insure that the array values will not react excessively to random inputs. Upper and lower bounds are placed on the values contained in the array.

From this discussion, it can be seen that the adaptive/predictive system of this invention requires communication between distributed intelligence modes during the adaptation phase. However, after the phase has reached convergence and enters the predictive phase, the volume of communication between the district regulator station and the remote low-pressure monitor is greatly reduced or eliminated. The pressures observed by the remote low-pressure monitors should remain within the programmed deadband and no communication will be initiated. This approach eliminates the expense of a continuous feedback communication and the labor of manually compiling a load prediction profile. The low-pressure monitors are left in place to provide means for updating load profile if the long term usage changes sufficiently to warrant it. In addition, the low-pressure monitors provide immediate notification if hazardous pressures are observed on the system for any reason.

In practice, all the district regulators and low point monitors of the flow distribution system communicate with a central computer at least once per day. This low level of communication verifies the integrity of the system.

It will be apparent to those skilled in the art that there can be a one to one correspondence between low-pressure monitors and district regulator controllers. Alternatively, a low-pressure monitor may communicate with a plurality of district regulator controllers. In accordance with yet another embodiment, a district regulator controller receives data from a plurality of low-pressure monitors.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An adaptive, predictive control system for outlet pressure adjustment of at least one district regulator of a fluid distribution system so as to satisfy a real-time demand for a fluid distributed by said fluid distribution system comprising:

intelligent controller means for controlling said at least one district regulator comprising means for communicating with at least one intelligent monitor means disposed in said fluid distribution system at a distance from said at least one district regulator, means for adjusting an outlet pressure of said at least one district regulator, means for sensing a fluid inlet pressure and a fluid outlet pressure of said at least one district regulator, and for sensing ambient temperature proximate said at least one district regulator to predetermine an initial output pressure set point for said at least one district regulator;

said at least one intelligent monitor means comprising communication means for communication with said controller communication means, monitor pressure sensing means for sensing a fluid pressure in said fluid distribution system proximate said at least one intelligent monitor means, and monitor ambient temperature sensing means for sensing a monitor ambient temperature proximate said at least one monitor means; and an adaptive means operating in communication with said intelligent controller means, said adaptive means generating a prediction of fluid demand and a corresponding district regulator fluid outlet pressure setting.

2. A control system in accordance with claim 1, wherein said fluid distribution system is for distribution of natural gas.

3. A control system in accordance with claim 1, wherein said adaptive means comprises an adaptive finite impulse response filter.

4. A control system in accordance with claim 1, wherein said at least one intelligent monitor means is a low pressure monitor.

5. A control system in accordance with claim 1 comprising a plurality of said intelligent controllers.

6. A control system in accordance with claim 5, wherein said at least one intelligent monitor means is in communication with a plurality of said intelligent controllers.

7. A control system in accordance with claim 1, wherein said at least one intelligent controller is in communication with a plurality of said intelligent monitors.

8. A control system in accordance with claim 1 further comprising means for updating the prediction of fluid demand based on measured pressure at said at least one remote intelligent monitor means.

9. A control system in accordance with claim 1, wherein said intelligent controller means further comprises means disposed proximate said at least one district regulator for identifying the time of day.

10. A control system in accordance with claim 1 further comprising supervisory computation means for providing status checks and manual overrides of said at least one intelligent controller means and said at least one intelligent monitor means operatively connected to said intelligent controller means and said at least one intelligent monitor means.

11. In a fluid distribution system comprising a plurality of distribution pipelines, at least one fluid district regulator and control means for controlling said at least one fluid district regulator, the improvement comprising:

an intelligent controller means operatively connected to said at least one fluid district regulator for controlling said at least one district regulator;

at least one intelligent monitor means for monitoring ambient temperature and fluid pressure in said distribution pipelines operatively connected to at least one of said distribution pipelines at a distance from said at least one fluid district regulator;

computer means for providing status checks and manual overrides of said intelligent controller means and said at least one intelligent monitor means operatively connected to said intelligent controller means and said at least one intelligent monitor means; and an adaptive algorithm operating in communication with said intelligent controller means, said adaptive algorithm generating a prediction of fluid demand and a corresponding district regulator fluid outlet pressure setting.

12. A fluid distribution system in accordance with claim 11, wherein said intelligent controller means comprises controller communication means for communicating with said at least one intelligent monitor means, controller pressure adjustment means for adjusting an outlet pressure of said at least one district regulator, controller inlet pressure sensing means for sensing a fluid inlet pressure of said at least one district regulator, controller outlet pressure sensing means for sensing a fluid outlet pressure of said at least one district regulator, controller ambient temperature sensing means for sensing a controller ambient temperature proximate said at least one district regulator, and a time of day clock disposed proximate said at least one district regulator.

13. A fluid distribution system in accordance with claim 12, wherein said at least one intelligent monitor means comprises monitor communication means for communication with said controller communication means, monitor pressure sensing means for sensing a fluid pressure in said fluid distribution system proximate said at least one intelligent monitor means, and monitor ambient temperature sensing means for sensing a monitor ambient temperature proximate said at least one monitor means.

14. A fluid distribution system in accordance with claim 11, wherein said adaptive algorithm comprises an adaptive finite impulse response filter.

15. A fluid distribution system in accordance with claim 11, wherein said at least one intelligent monitor means is a low pressure monitor.

16. A fluid distribution system in accordance with claim 11 comprising a plurality of said fluid distribution regulators and at least one said intelligent controller for each said fluid distribution regulator.

17. A fluid distribution system in accordance with claim 16, wherein said at least one intelligent monitor means is in communication with a plurality of said intelligent controllers.

18. A fluid distribution system in accordance with claim 11, wherein said at least one intelligent controller is in communication with a plurality of said intelligent monitors.

19. A method for controlling a fluid distribution regulator disposed in a fluid distribution system comprising the steps of:
- collecting actual fluid pressure data and ambient temperature data of said fluid distribution system at a distance from said fluid distribution regulator;
- communicating said actual fluid pressure data and said ambient temperature data to an intelligent controller operatively connected to said fluid distribution regulator;
- processing said actual fluid pressure data and ambient temperature data using an adaptive algorithm operatively in communication with said intelligent controller together with a controller local time, controller ambient temperature, and fluid distribution regulator outlet pressure data, resulting in generation of a predicted fluid distribution regulator outlet pressure;
- comparing said predicted fluid distribution regulator outlet pressure to said actual fluid pressure data;
- iteratively repeating said processing of said actual fluid pressure data and said ambient temperature data to generate said predicted fluid distribution regulator outlet pressure and comparing said predicted fluid distribution regulator outlet pressure to said actual fluid pressure data until a difference between said actual fluid pressure data and said predicted fluid distribution regulator outlet pressure is sufficiently small; and
- transferring control of said fluid distribution regulator outlet pressure to said adaptive algorithm.

20. An adaptive, predictive control system for outlet pressure adjustment of at least one district regulator of a fluid distribution system so as to satisfy a real-time demand for a fluid distributed by said fluid distribution system comprising:

said at least one district regulator having an intelligent controller means for initially determining an output fluid pressure of said district regulator;

at least one intelligent monitor means for measuring fluid pressure remote from said at least one district regulator, comparing the measured remote fluid pressure with a predetermined set point pressure, and communicating the measured remote fluid pressure to said at least one district regulator only if the difference of the measured remote fluid pressure differs from the set point by an unacceptable predetermined amount; and adaptive means for re-calibrating the initially determined output fluid pressure of said at least one district regulator so as to bring the remotely sensed pressure within an acceptable difference of the set point.

21. An intelligent monitor for measuring fluid pressure at a remote location from a district regulator comprising:

means for measuring fluid pressure at the remote location;

means for storing a predicted fluid pressure at the remote location;

means for comparing the measured fluid pressure at the remote location with the predicted fluid pressure and communicating with the district regulator only if the difference between the measured fluid pressure is different from the predicted fluid pressure by a predetermined amount.

22. The intelligent monitor in accordance with claim 21, wherein the difference of the measured fluid pressure and the predicted fluid pressure is communicated to the district regulator.

* * * * *